United States Patent [19]

Chen

[11] Patent Number: 5,007,403

[45] Date of Patent: Apr. 16, 1991

[54] FAN-SHAPED BARBECUE KETTLE

[76] Inventor: Ming-Tang Chen, No. 23-4, Alley 21, Lane 205, Yong Xing Road, Dali, Taichung, Taiwan

[21] Appl. No.: 557,041

[22] Filed: Jul. 25, 1990

[51] Int. Cl.$^5$ .............................................. F24B 3/00
[52] U.S. Cl. ............................ 126/25 R; 126/25 AA
[58] Field of Search ............. 126/25 R, 25 AA, 25 A

[56] References Cited

U.S. PATENT DOCUMENTS

| | | | |
|---|---|---|---|
| 2,164,835 | 7/1939 | Pearson et al. | 126/25 R |
| 4,561,417 | 12/1985 | Chen | 126/25 A |
| 4,598,690 | 7/1986 | Hsu | 126/25 R |

Primary Examiner—Carroll B. Dority
Attorney, Agent, or Firm—Browdy and Neimark

[57] ABSTRACT

A fan-shaped barbecue kettle comprises a kettle shell in fan-shape, an air hole on each of the fan-shaped end walls in the vicinity of a charcoal grill which is inside the kettle shell, a cover, and a roasting grill which can fold up, stand upright or change into a roasting cage. The upper rim of each of the fan-shaped walls is provided with some opposite openings to support barbecue skewers or spits and make their distances from the fire adjustable as well. In addition to controlling the fire condition in the kettle shell, the air holes allows the fire-initiating materials to be inserted into the kettle shell while fire building proceeds. If more charcoal briquets are needed to send to the inside of kettle, they can be fed thereto via this air opening without removing any of the roasting grill and roasted objects. Convenience and time saving are achieved in this way. If necessary, kettle cover can be removed.

7 Claims, 3 Drawing Sheets

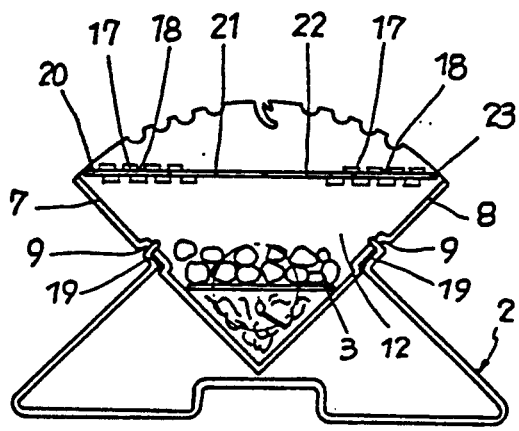
FIG.3 A-A SECTION
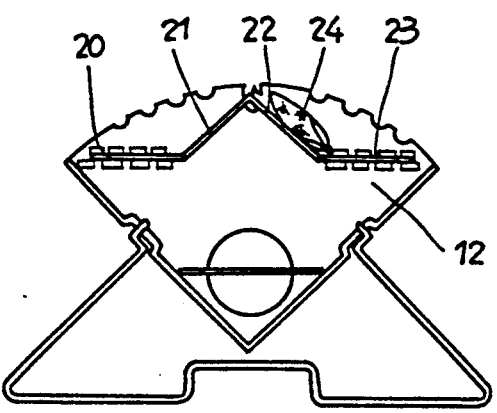
FIG.4 A-A SECTION
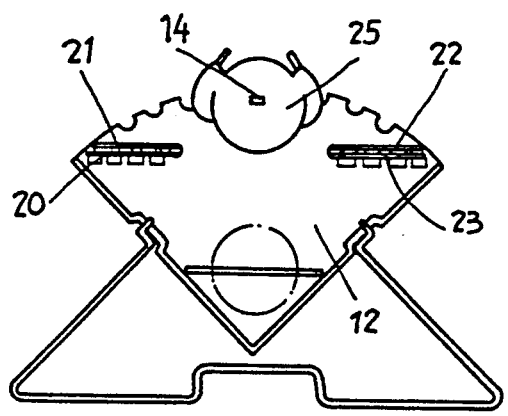
A-A SECTION
FIG. 5
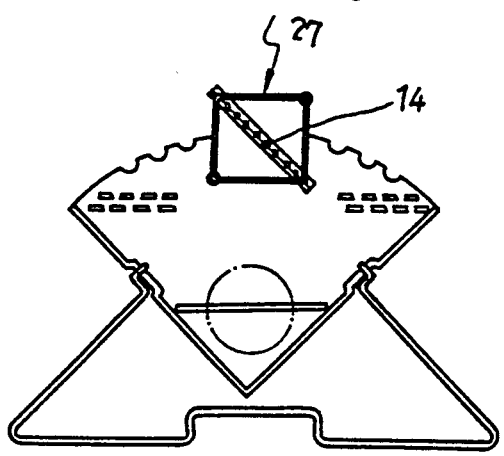
A-A SECTION
FIG. 6
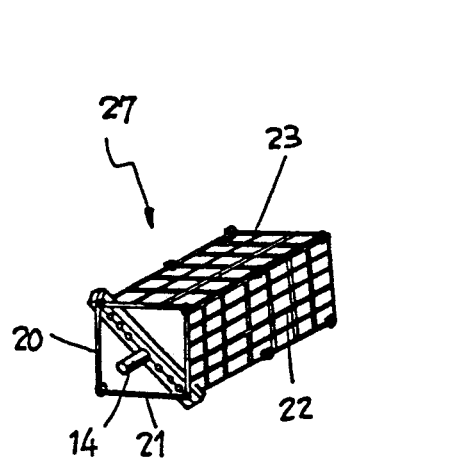
FIG.8
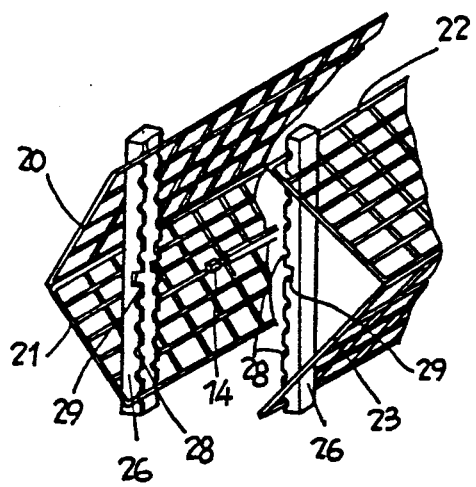
FIG.7

FAN-SHAPED BARBECUE KETTLE

FIELD OF THE INVENTION

This invention relates to a fan-shaped barbecue kettle, and particularly to a kind of barbecue kettle which has a fan-like outer shape in which the roasting grills can be put flat, partly-slanted, or made into a roasting cage for roasting various kinds of food and meat. And, if roasting a full chicken is desired, the roasting grills can be folded to provide a central open space in the barbecue kettle for that roasting.

BACKGROUND OF THE INVENTION

Conventional barbecue kettles for cookout are structurally either rectangular or round with their bottoms centrally concave and basin-like where the roasting grill, charcoal support grill and, in some cases, kettle lid are provided. They have common shared features. In making a fire, fire seeds or fire-initiating materials are firstly placed on the bottom of the barbecue kettle, then the charcoal grill and charcoals are put in place, and when the charcoal has been ignited, the flat roasting grill, which can bear various food to be cooked is put in place. Yet if roasting a full chicken is desired, the roasting grill must be removed to create sufficient space to allow that roasting to occur. Though usable, such conventional barbecue kettles are found to have the following shortcomings:

1. Because the roasting grill is flat and can do flat-roasting only, an evenly roasted degree to all parts of the roasted object requires manual adjustment of the food. That turns out to be especially troublesome when cooking smaller pieces of food which need to be turned over one by one.

2. Because the roasting grill must be removed to allow roasting a full chicken, the problem of how to securely settle it for roasting arises. And the heat force, surrounding full chicken inside the barbecue kettle, would then no longer be used.

3. During roasting time of a full chicken, the kettle lid, if any, must be taken down to allow dressings application to the chicken's surfaces. Removal of the lid doubtless causes a quicker loss of heat and lengthens the roasting time.

4. To provide charcoals during roasting time, the kettle lid, roasted objects and roasting grill all have to be removed or moved aside to enable placement of fresh charcoal onto the charcoal grill.

5. The force of the fire inside the kettle is under full control.

6. To make a fire, charcoal grill and roasting grill both have to be removed away to allow ignition of the fire seeds or fire-initiating materials at the kettle bottom. Furthermore, in case of fire failure, the half-combusted charcoals must be taken out and that may easily cause burning.

OBJECTS OF THE INVENTION

The present invention is mainly to solve the shortcomings of the prior art noted above by providing a newly structured barbecue kettle of which the features are:

1. The roasting grill comprises two detachably connected roasting grills formed of four narrower roasting grills connected in a pivoted manner, which can take flat-roasting, partly slant-roasting, or be formed into a roasting cage to turningly roast smaller food, to save labor that would otherwise be used in turning over roasting food pieces one by one.

2. In roasting a full chicken, the roasting grill can remain in place. It simply needs to have two of the central narrower roasting grills folded over onto their other sides on top of the two narrower adjacent grills respectively to create a central open space for that roasting. And as to the folded roasting grills, they are still usable with other food roasting.

3. By way of an air-out flute at the center of kettle lid, a brush for applying dressings and sauces can enter the barbecue kettle and apply same to a roasted full chicken. By this means, the heat loss is quite slow and, therefore, roasting time can be shortened.

4. Since there is an air opening in each fan-shaped side wall, a gripper carrying charcoal can pass therethrough to put it onto the charcoal grill during roasting time. In this way, kettle lid, roasted objects and roasting grill can all remain undisturbed while adding more charcoal.

5. Through the opening of the sidewall opening air, the fire force inside kettle is kept well under control.

6. To make a fire, charcoal grill and roasting grill need not be removed. It simply requires one to put a suitable amount of charcoals onto charcoal grill and, after fire seeds of fire-initiating materials placed through air opening into the kettle bottom and ignited, initiate combustion. In case of a fire failure, there is no need to withdraw any half-combusted charcoals; it is only necessary to feed fire-initiating materials once again through the lower half of air opening. So time-saving and preventing burning harm are both achieved.

SUMMARY OF THE INVENTION

A fan-shaped barbecue kettle comprises a fan-shaped kettle shell of which the lower part of either fan-shaped end wall is provided with an air opening, a charcoal grill placed inside the kettle shell, a roasting grill which can be foldable, upright, and made to be a roasting cage, and a lid for covering kettle shell. The kettle shell's upper rims are provided with a few concavities or recesses by which the spits or skewers lined with meat or bearing a full chicken are supported. By way of the air openings, fire seeds or fire-initiating materials can be put therethrough into the kettle bottom for making a fire. And also by way of air openings, charcoal can be supplied therethrough to the charcoal grill during roasting time, avoiding the trouble to hold up roasting grill and food objects being roasted. So saving time and more convenience are achieved. Above all, kettle lid can be put away and used as necessary, in which circumstance the above-said effects remain just the same.

BRIEF DESCRIPTION OF THE DRAWINGS

FIG. 3 is a sectional view taken along A—A line in FIG. 2, showing roasting grill flatly inserted between two wall ends of the kettle shell;

FIG. 4 is a sectional view taken along A—A line in FIG. 2, showing the two central narrower roasting grills take an upside-down "V" form;

FIG. 5 is a sectional view taken along A—A line in FIG. 2, showing the two central narrower roasting grills are folded onto their other sides of narrower roasting grills and leave a central open space for roasting a full chicken; and FIG. 6 is a sectional view taken along A—A line in FIG. 2, showing the roasting grill takes a form of engaged roasting cage;

FIG. 7 shows structure of the roasting cage of the invention; and

FIG. 8 is a perspective appearance view of the roasting cage of the invention.

SPECIFIC DESCRIPTION

Figure 1:
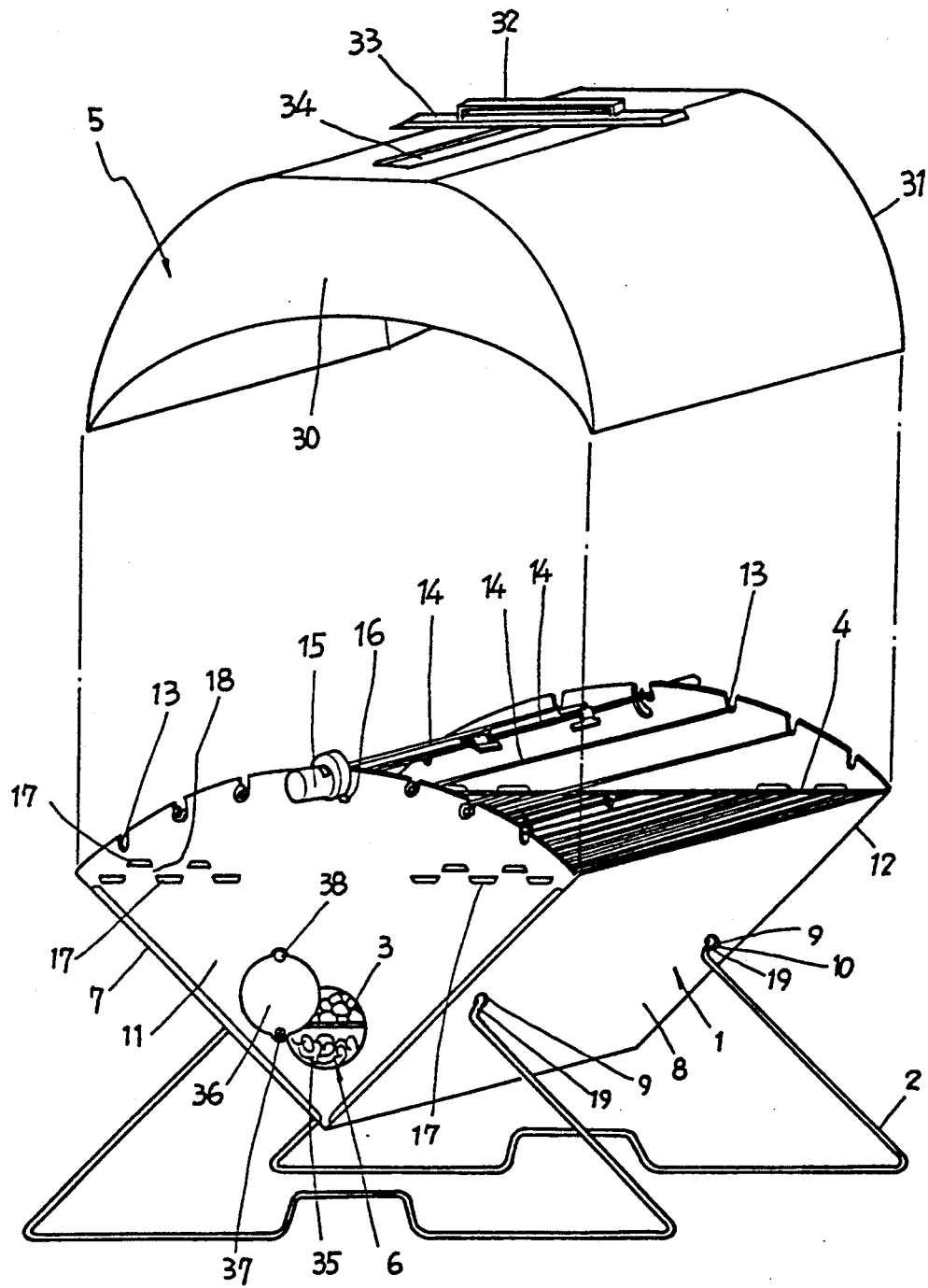
FIG. 1 is a perspective view of a preferred embodiment according to the invention.
Figure 2:
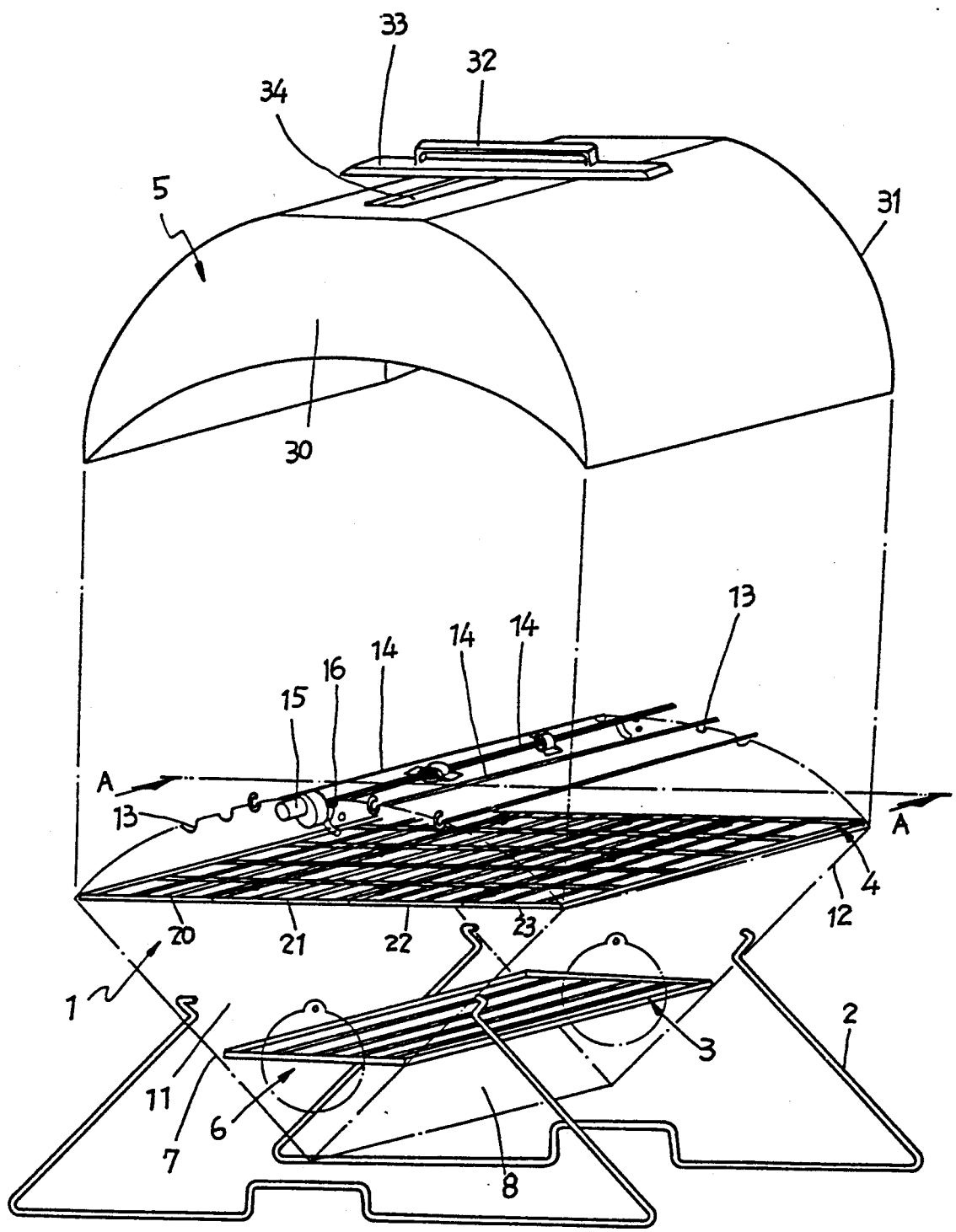
FIG. 2 shows the internal structure of the invention in FIG. 1.

Firstly referring to FIGS. 1, 2, this invention comprises: kettle shell 1, leg 2, charcoal grill 4, lid 5 and air drain opening 6. Kettle shell 1 is a hollow, fan-shaped shell body made up by metal sheets in a welded or riveted way, of which the outer face of side walls 7, 8 each is provided with two catching holes 9 and fixed, inwardly concave points 10 with which to hold up a pair of legs 2 firmly in their upright pose. The upper rim of fan end walls 11, 12 takes a convexly arc shape and is provided with a few oppositely facing recesses 13 by which the meatholding barbecue spits or skewers can therefore be supported, and a fixed hole 16 to mount with a motor 15 that the barbecue spit bearing a full chicken, a roasting cage 27 (as FIG. 8 shows), or something of a large-sized piece of meat can be caused to turn to roast. And at an altitude roughly same as side walls 7, 8, there is provided a groove 18, created by some fixed, inwardly extending convex points 17 on the inner face of each fan end walls 11, 12, to stabilize the roasting grill 4 after its lateral insertion thereto. In the lower halves of fan-shaped end walls 11, 12, there is provided the circular air drain opening 6 each in the center, the open degree of which dominate how much air can enter into kettle shell 1 and thereby control of the extent of fire force. Also by way of air drain opening 6, charcoal supply can be brought onto the charcoal grill 3 and fire seeds or fire-initiating materials to the kettle bottom as needed.

As FIGS. 1, 3 show, leg 2 has a pair of upwardly extending parts, and each is a properly thick metal thread bent into a triangle shape but without the head angle portion. The L-end 19 can be caught in catching hole 9 and secured by fixed, inwardly concave point 10, on the outer face of side walls 7, 8, to brace kettle shell 1 upright.

As FIGS. 2, 3 show, the charcoal grill 3 is structurally the same as a relatively narrow conventional one but has a width that corresponds to the cone degree of the kettle shell 1 to enable its positioning just alongside the central line of the air drain opening 6 on fan-shaped end walls 11, 12 so supplying charcoals through the upper half of the air drain opening 6 and placing fire seeds or fire-initiating materials through the lower half thereof to kettle bottom can be effected.

As FIGS. 2, 3 show, the roasting grill 4 actually includes two roasting grills; one made up by two narrower roasting grills 22, 23 in a pivoted way and the other by two narrower roasting grills 20, 21 also pivotally connected together. Both, after inserting their ends into groove 18 of fan walls 11, 12 from alongside the top periphery of side walls respectively, become a plane roasting grill 4 (as FIG. 3 shows). Another option is to put forward the two roasting grills to create an inverted "V" form (as FIG. 4 shows) by the standing of narrower roasting grills 21, 22, on which some other food, such as corn, may be roasted in a slant way that the heat spreads out more evenly. And also, narrower roasting grill 21 can be folded onto narrower roasting grill 20, and narrower roasting grill 22 onto narrower roasting grill 23 (as FIG. 5 shows), to leave out a central open space for roasting full chicken 25 and, in the meantime, to roast any other food if desired on narrower roasting grills 21, 22.

As shown in FIGS. 6, 7, 8, the roasting grill 4 can form into a roasting cage 27 by means of a clamper 26. Either side of the clamper 26 is provided with a plurality of engaging teeth 28 and a mid spit-holding gap 29 for securing the frame of narrower roasting grill 20, 21, 22, 23 and central barbecue spit 14 into a square or rhombic roasting cage 27 wherein some of the smaller or odd food may be contained. With spit 14 protruding from its two ends, the cage can be well supported on the central recess 13 of the upper rims of fan walls 11, 12 and driven by motor 15 to turningly roast food.

Just as FIGS. 1, 2 show, lid 5 has a shape adapted to the kettle shell's upper configuration and whose side plate 30, 31 has a concave lower rim, so even under the lid covering every spit 14 can still freely turn. The top center of the lid 5 is provided with a hand-hold 32, and of which the handhold base 33 is made through a center point-pivoted way to link with a connection piece beneath the air-outlet flute 34. Thus, turning handhold base 33 is expected to control the open degree of air-outlet flute 34 and, coupled with that open degree of air inlet 6, influence the amount of heat inside the kettle shell 1. And to apply dressings or sauces while roasting a full-chicken roasting time, lid 5 needs no removal; it is only required that air-outlet flute 34 is opened to allow a brush covered with dressings therethrough. As necessary lid 5 can be put aside, in which case roasting effects would not be much affected but a quicker pace of heat loss will occur.

As shown in FIGS. 1, 3, air drain inlet, 6 which constitutes the opening 35 and its somewhat larger cover 36 is located in the lower half of kettle shell's fan wall 11, 12, within contact of charcoal grill 3. Cover 36 is provided with lug 37, 38 protruding from its periphery. By riveting lug 37 to the fan wall above hole 35, cover 36 is attached to the hole 35 and, therefore, can close or open it by the moving of lug 38 to control air amount entering kettle shell 1 to control fire force inside. Expectedly, an opened hole 35 allows fire seeds or fire-initiating materials to be sent to the kettle bottom and charcoal supply sent by a gripper onto the charcoal grill 3.

I claim:
1. A fan-shaped barbecue kettle, comprising:
   a kettle shell, which is a hollow body having fan-shaped end walls with a pair of legs connected to two side walls and either of whose fan-shaped end walls has a convexly arc upper rim wherein a few recesses are provided in an opposing manner to support the ends of a barbecue spit and there is provided a fixed hole in the vicinity of a central recess to which a motor may be secured to drive a barbecue spit to turn; a groove created by some inwardly extending convex points on either of the fan-shaped end walls to allow lateral insertion thereto of a roasting grill to take position at a height about equal to the height of said side walls; there being provided an air inlet in the lower half central portion of either fan wall;
   said pair of legs bent to be triangle-like without a head angle and having two L-ends which can get caught and connected to said kettle shell's two side walls;

a roasting grill, comprising two separable roasting grills, each being formed of two narrower roasting grills pivoted together, respectively inserted in said groove of the fan-shaped end wall from along the kettle shell's side wall to make out a plane roasting grill;

a lid, which is shaped in conformance to the kettle shell's upper configuration and has two side plates concavely arc-shaped, and the top center of which is provided with a handhold which is pivotedly connected to a connection piece of an air-outlet flute provided at the same location, so that turning said handhold may control said air-outlet flute to open or close;

an air inlet which comprises a hole and a slightly larger adapted cover, the hole being provided in a lower half of either fan-shaped end wall within the contact with a charcoal support grill while the cover is provided with two lugs, one said lug being riveted above the hole whereby the degree of opening of the hole is controlled by moving the cover via the other lug.

2. The barbecue kettle according to claim 1, wherein the two separable roasting grills can both be pushed forward to create an inverted "V" shape formed by two of the central, narrower roasting grills.

3. The barbecue kettle according to claim 1, wherein the two central, narrower roasting grills may be respectively folded onto the narrower roasting grill nearby to leave out a central open space for roasting a full chicken, and the folded roasting grills then are still usable with other food roasting.

4. The barbecue kettle according to claim 1, further comprising a clamper wherein the four narrower roasting grills may be all withdrawn from the groove of the fan wall and made to form a jointed roasting cage by means of said clamper.

5. The barbecue kettle according to claim 1, wherein said air inlet is sufficiently large to permit insertion therethrough of fire seeds, fire-initiating materials and charcoal supply to the kettle interior.

6. The barbecue kettle according to claim 1, wherein said air-out flute at the top of lid can be opened and therefore allows a brush covered with dressings to enter the kettle interior to make application.

7. This barbecue kettle according to claim 1, wherein said lid is completely removable.

* * * * *